United States Patent
Keyson

Patent Number: 6,046,726
Date of Patent: *Apr. 4, 2000

[54] VIRTUAL WORKSPACE WITH USER-PROGRAMMABLE TACTILE FEEDBACK

[75] Inventor: David V. Keyson, Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/939,351

[22] Filed: Sep. 29, 1997

Related U.S. Application Data

[63] Continuation of application No. 08/802,820, Feb. 19, 1997, abandoned, which is a continuation of application No. 08/523,069, Sep. 1, 1995, abandoned.

[30] Foreign Application Priority Data

Sep. 7, 1994 [EP] European Pat. Off. .............. 94202568

[51] Int. Cl.[7] ........................................................ G09G 5/00
[52] U.S. Cl. ............................................. 345/156; 345/131
[58] Field of Search ...................................... 345/156, 158, 345/161, 163, 157, 112, 119, 127, 131, 147, 133; 395/118, 119, 154, 155, 161

[56] References Cited

U.S. PATENT DOCUMENTS

| | | | |
|---|---|---|---|
| 4,988,981 | 1/1991 | Zimmerman et al. | 345/156 |
| 5,148,154 | 9/1992 | Mackay et al. | 345/119 |
| 5,184,319 | 2/1993 | Kramer | 345/156 |
| 5,381,158 | 1/1995 | Takahara et al. | 345/156 |

FOREIGN PATENT DOCUMENTS

| | | | |
|---|---|---|---|
| 0489469 | 6/1992 | European Pat. Off. . | |
| 0009984 | 6/1992 | WIPO | 345/156 |

*Primary Examiner*—Chanh Nguyen
*Attorney, Agent, or Firm*—Peter Verdonk

[57] ABSTRACT

The user interacts with a virtual workspace through guiding a cursor across a display screen for visual representation of the workspace. A user-interface provides a tactile response which is user-programmable and enables specifying tactile fields at particular locations in the virtual workspace. The user navigates through the virtual workspace by guiding the cursor while experiencing the tactile response fields programmed in advance.

12 Claims, 1 Drawing Sheet

VIRTUAL WORKSPACE WITH USER-PROGRAMMABLE TACTILE FEEDBACK

This is a continuation of application Ser. No. 08/802,820, filed Feb. 19, 1997, now abandoned, which is a continuation of Ser. No. 08/523,069, filed Sep. 1, 1995 now abandoned.

BACKGROUND OF THE INVENTION

The invention relates to an information processing system for enabling to interact with a virtual workspace. The system comprises a display for visual representation of the virtual workspace, and an interface device for providing a tactile response to a user interacting with the virtual workspace. The invention also concerns a method of enabling to interact tactilely with the virtual workspace.

BACKGROUND ART

European Patent Publication 489 469 (PHN 13522) discloses a user-interface device providing tactile feedback for use in a system of the aforesaid type. The device includes a mouse or a trackball and is provided with a servomechanism to generate both negative and positive accelerations of the device's ball or cylinder. The artificially generated accelerations furnish tactile cues to the user manipulating the device, e.g., for the purpose of assisting in the control of a cursor on a display that provides visual access to the, typically two-dimensional, virtual workspace. Adding touch to the visual and/or auditory senses increases bandwidth of the information available to the user. The positive and negative accelerations derive from, for example, a tactile field pre-defined on the display to realize preferred positions and to guide the user when moving the cursor across the display.

OBJECT OF THE INVENTION

It is an object of the invention to provide an information processing system of the kind set forth in the preamble that essentially broadens the scope of user-interactivity with the virtual workspace in respect of the tactile feedback.

SUMMARY OF THE INVENTION

To this end, the invention furnishes a system as specified in the preamble, characterized in that the system includes programming means for enabling programming an attribute of the tactile response. The virtual workspace thus is provided with programmable tactile feedback. The tactile feedback may be programmable by, e.g., by the user or by the contents (software) provider.

In the system of the invention, the interaction with the virtual workspace is customized by (pre)-programming or re-programming the interactive characteristics of the system, in respect of the tactile feedback to the user. An example of such a characteristic or attribute is the relationship between the location in the virtual workspace and the tactile feedback. The programmability feature permits, as it were, to handle the tactile response as an object in the virtual workspace, much in the same way as an icon. The term "tactile field" is used herein to refer to this tactilely perceivable entity within the context of the virtual workspace. That is, the tactile response as perceived by the user corresponds with a tactile field in the virtual workspace.

Icons are well known in the art of user-interfaces. An icon is a small pictorial representation of some larger set of information that is accessed or operated upon through actuation of the icon. Icons have turned out to be useful tools, designed to trigger within the mind of the human, through visual perception, operator concepts that quickly communicate the contents or operation of the system. In the invention on the other hand, a tactile field provides haptic information through a suitable kinesthetic user-interface and serves to furnish an aid for, e.g., tactile navigation through the virtual workspace. Tactile cues then are applied to enhance the user's ability to search for and locate information along suggested information paths. In the invention, these tactile cues can be specified and (re-) programmed, e.g., by the user himself and can be handled as tactile icons.

The programming means may be provided with the options to select or program in advance, for example, at least one of following attributes of a tactile field: a location, in the virtual workspace, of a tactile field; a strength of the tactile field; a variation of the tactile field with position in the virtual workspace; a spatial extent, in the virtual workspace, of the tactile field; or a directional property, in respect of the virtual workspace, of the tactile field. For example, a tactile field may be specified that, upon the user interacting with the system, gives the impression of moving a material object in a force field when the cursor is moved. Examples of such a force field are gravity which has a fixed particular direction, or friction which depends on the speed of the cursor relative to the virtual workspace. Note that the tactile field typically has spatially restricted dimensions, thereby requiring the user-interface device to produce both negative and positive reaction forces when the cursor is guided through a tactile field.

Thus, the invention enables to customize the virtual workspace. A particular one among a plurality of tactile fields is selected, e.g., by the user, and one or more characterizing parameters of the particular tactile field are adjusted. The user thereupon maps the adjusted tactile field onto the virtual workspace.

Alternatively or supplementarily, the conditions under which a particular tactile response should occur may be specified in advance. That is, the dependence of the tactile response on the state assumed by the system or, more specifically, by the virtual workspace may be prescribed. The conditions may relate to, for example, a certain amount of time elapsed since a particular event in the workspace occurred, or to a route taken by the user while navigating through the virtual workspace. The invention thus renders the conditional occurrence of the tactile feedback individualizable.

Furthermore, a dynamic behaviour of the tactile field may be programmed. The tactile field can show dynamical behaviour in that the user experiences a time-dependent, e.g., vibrational or declining, force through the user-interface when the cursor is within the field's local range. In another example of dynamic behaviour the intensity of the tactile field may wear down when the field is repeatedly actuated, i.e., dependent on the cursor movement, or the field may simply fade away in the course of time, i.e., independent of the cursor movement or after a particular time has elapsed since the user lastly carried out an action in the virtual workspace.

The programming means may provide a pictorial representation of the tactile field, thus augmenting the information content of the workspace. Adding touch to visual, and possibly auditory, perception increases the bandwidth of available information. The tactile field may occur in combination with an icon that symbolizes a tactile object. Alternatively, the tactile field may be present as a separate information-carrying item not specifically linked to a pictorial representation.

Further, associating pictorial with tactile representations permits selection or modification of the tactile field through manipulation of the pictorial representation. The pictorial representation of the tactile field then could be cancelled or hidden, e.g., by a menu option, after the tactile field has acquired its desired manifestation. In a sense, this aspect of the invention provides a user-interface for programming a further user interface.

Preferably, the programming means has available, as a library, a plurality of prototypes of tactile fields. One or more particular ones of the tactile fields are selected for assignment to one or more specific locations or areas in the virtual workspace. Each such prototype preferably is individually adjustable with regard to, e.g., strength, shape or size. Also, two or more of the tactile fields may be merged to provide a compound tactile field. For example, the library may contain a prototype field that gives the user the impression of a pit when manipulating the user-interface within its range, and another one that has the tactile texture of a corrugated surface. The pit field can be modified into a ditch by extending the pit in a particular direction. The corrugated surface can be mapped onto and along the ditch, resulting in a tactile field with pronounced directional characteristics.

The type of user-interface device need not be restricted to the mouse or trackball mentioned above, or a joystick, but could be any other device that allows the user to interact tactilely with the virtual workspace shown on the display by letting the user experience both a resistive force, i.e., opposing the cursor movement, and a driving force, i.e., aiding the cursor movement. The user-interface device is caused to provide the reaction forces in response to the position or movement of the cursor relative to the tactile fields.

BRIEF DESCRIPTION OF THE DRAWING

Further details of the invention are explained below by way of example and with reference to the accompanying drawing, wherein.

DETAILED DESCRIPTION OF THE PREFERRED EMBODIMENTS

Figure 1:
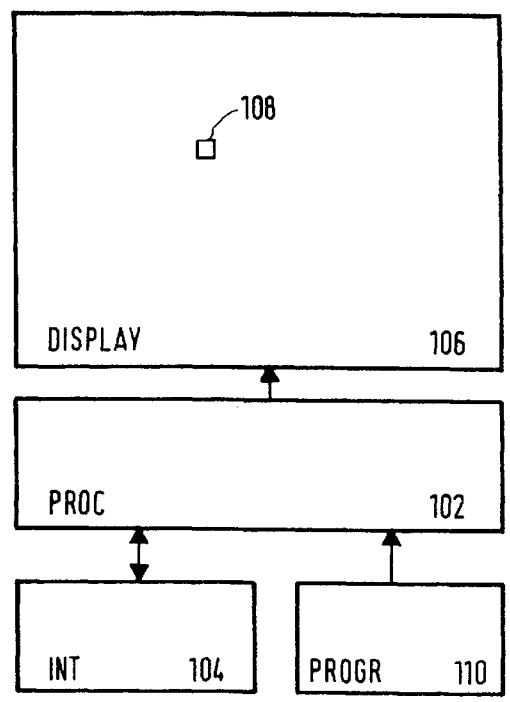
FIG. 1 is a block diagram of a system in the invention.

FIG. 1 is a block diagram of a system 100 according to the invention. System 100 functionally comprises an information processing apparatus 102, a user-interface device 104 and a display 106, both coupled to apparatus 102. When the user is communicating with apparatus 102, user-interface device 104 is operative to provide tactile feedback to the user under control of apparatus 102, e.g., when the user is guiding a cursor 108 across a virtual workspace, typically two-dimensional, shown on display 106 through manipulation of device 104. User-interface device 104 is, for example, of the type shown in European Patent Publication 489 469 mentioned above. System 100 further includes programming means 110 to enable programming the desired tactile response. System 100 may be a portable or a stand-alone arrangement, such as a PC, a game computer or an on-board computer in a car e.g., for navigational purposes. Alternatively, system 100 may have its functional parts as the ones specified in the drawing geographically distributed. For example, system 100 may be a client-server network wherein processing apparatus 102 serves a plurality of users, each being provided with a respective user-interface device 104, a respective display unit 106 and a respective programming means 110. Applications run on processing apparatus 102 then may be customized with regard to the tactile response with regard to each user individually, e.g., in a multi-media environment.

Figure 2:
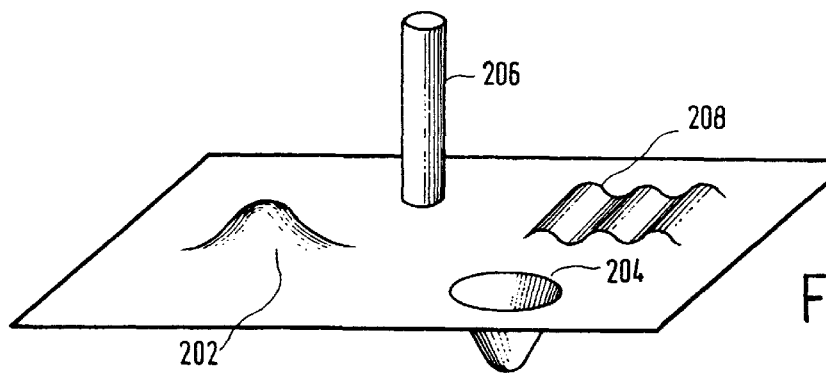
FIG. 2 gives examples of tactile fields.

FIG. 2 illustrates various examples of tactile fields as kinesthetically experienced by the user when exploring the virtual workspace on display 106 with device 104. Field 202 represents a bump and field 204 a pothole. Field 206 gives the impression of a solid pole. Field 208 let the user experience speed bumps.

Figure 3:
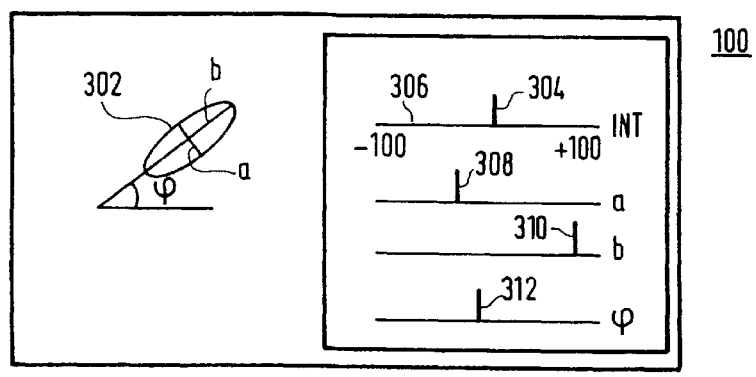
FIG. 3 is an example of adjusting a tactile field via its pictorial representation.

FIG. 3 illustrates the programmability feature for customizing the tactile fields. A prototype tactile field is retrieved, e.g., through a menu on display 106. The field's representation 302 is shown on display 106 to have an ellipsoid perimeter in the plane of cursor movement in this example. For ease of visualization, one can imagine representation 302 to be the perimeter of field 202 or 204 in FIG. 2. Upon retrieval, one is enabled to select the intensity of the tactile field, e.g., by sliding an indicator 304 along an intensity scale 306 and thus selecting an appropriate value. The scale is shown on display 106 from −100 (pothole) to +100 (bump). Similarly, one can change shape of the ellipsoid by adjusting the axes "a" and "b" through setting indicators 308 and 310 at the desired values. Also, the orientation of the ellipsoid can be modified through varying the angle $\phi$, again by setting indicator 312 at the desired value.

Other adjustment procedures can be imagined, such as those operating on visual representations through a mouse for dragging a selected point along to a desired position, thereby continuously varying the visual representation. In this manner, a continuous mapping of a prototype onto the virtual workspace is achieved by selecting parameter values specifying size, extent, intensity, shape, etc. In addition, dynamic behaviour, tactile texture or any other characteristic parameter suitable for further determining a tactile field can be made programmable. Mapping with randomizing features can be used to create surprising effects.

What is claimed is:

1. An information processing system for enabling a user to navigate through a virtual workspace, said system comprising:

a display screen for visual representation of the virtual workspace; and a user-interface device for a user to guide a cursor object across the display screen and for providing a tactile response to the user while guiding the cursor object, wherein, prior to navigating through the virtual workspace under the guidance of a programmed tactile response, the system renders user-programmable at least one of the following parameters of the tactile response, corresponding with a tactile field in the virtual workspace, as selected from the group consisting of strength, size, and shape, and wherein the system enables the user to program a mapping of an adjusted particular tactile field onto the virtual workspace, and wherein the tactile response is programmable to aid the cursor movement.

2. The system of claim 1, wherein the system provides a pictorial representation of the tactile field on the screen to support the programming.

3. The system of claim 2, further comprising enabling operating on a particular one of the parameters by operating on the pictorial representation.

4. The system of claim 1, comprising a library of a plurality of tactile fields, each respective tactile field thereof for being mapped onto the virtual workspace upon selection by the user.

5. The system of claim 1, enabling the user to program the tactile response to be conditionally dependent on a specific state of the virtual workspace.

6. The system of claim 1, wherein, prior to navigating through the virtual workspace under guidance of the programmed tactile response, a parameter of the tactile response that is rendered user-programmable by the system further comprises a dynamic behavior of the tactile field.

7. The system of claim 6, wherein said dynamic behavior is programmable to cause the user to experience a time-dependent force through the user-interface when the cursor is within a local range of the tactile field.

8. The system of claim 6, wherein said dynamic behavior is programmable to have the tactile field fade away in the course of time as independent of cursor movement.

9. The system of claim 6, wherein said dynamic behavior is programmable to have the tactile field fade away in the course of time after a particular time has elapsed since the user last carrier out an action in the virtual workspace.

10. The system of claim 1, further comprising a user-interface device producing both negative and positive reaction forces when the cursor is guided through a tactile field.

11. A method of enabling a user to navigate through a virtual workspace, said method comprising the steps of:
   providing a visual representation of the virtual workspace on a display screen;
   enabling a user to guide a cursor object across the display screen;
   providing a tactile response to the user while guiding the cursor object; and
   enabling the user to program a parameter of the tactile response prior to navigating through the virtual workspace, wherein the tactile response corresponds with a tactile field in the virtual workspace, wherein the programming includes:
   selecting a particular tactile field from among a plurality of tactile fields which is individually adjustable with regard to strength, shape or size prior to navigating through the virtual workspace under guidance of the programmed tactile response,
   adjusting a parameter of the particular tactile field, and
   mapping the adjusted particular tactile field onto the virtual workspace.

12. A method of enabling a user to navigate through a virtual workspace, said method comprising the steps of:
   providing a visual representation of the virtual workspace on a display screen;
   enabling a user to guide a cursor object across the display screen;
   providing a tactile response to the user while guiding the cursor object; and
   enabling the user to program a parameter of the tactile response prior to navigating through the virtual workspace, wherein the parameter of the tactile response that is rendered user-programmable by the system comprises a dynamic behavior of the tactile field, and wherein said dynamic behavior is programmable to have intensity of the tactile field wear down when the tactile field is repeatedly actuated.

* * * * *